No. 778,631.

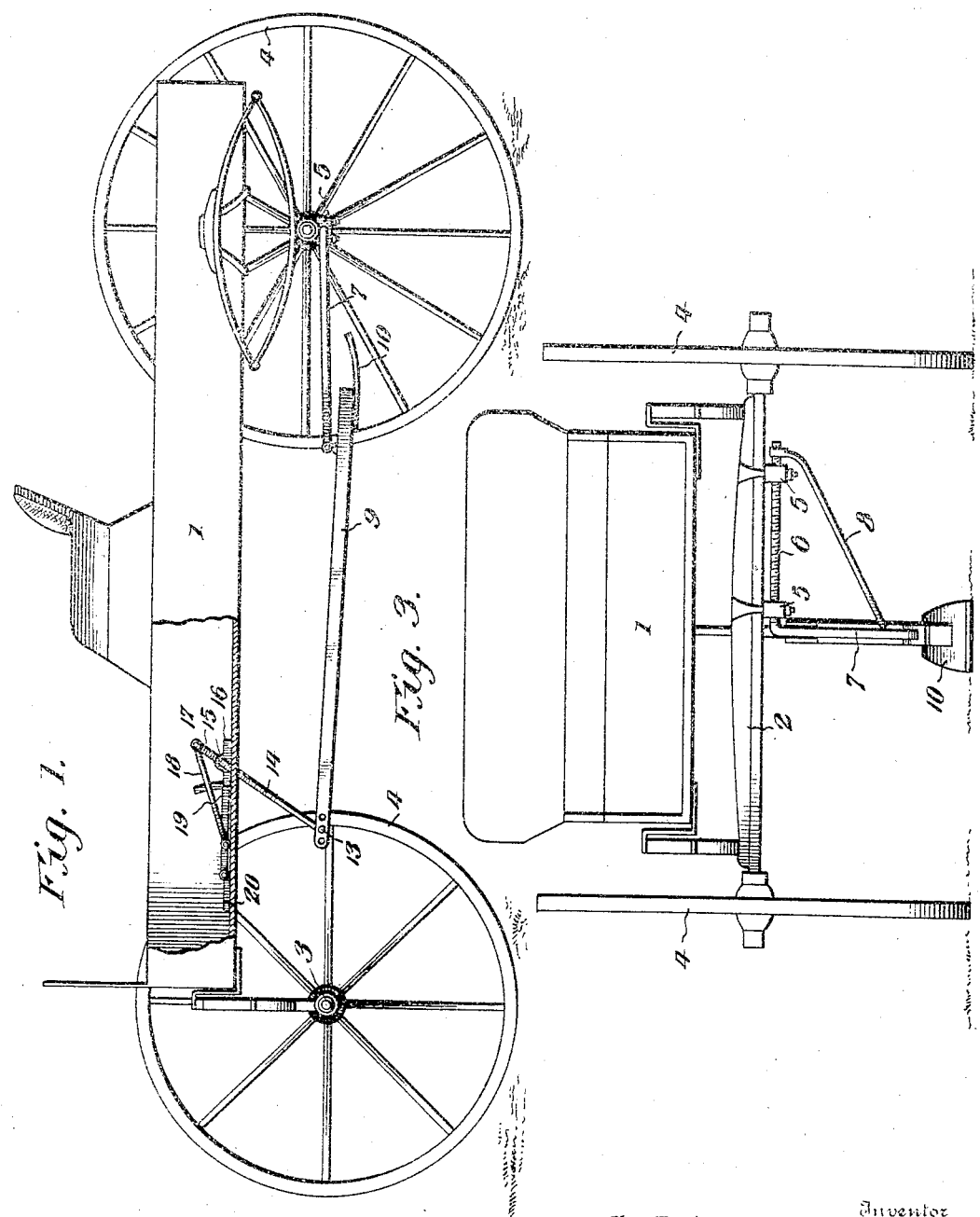

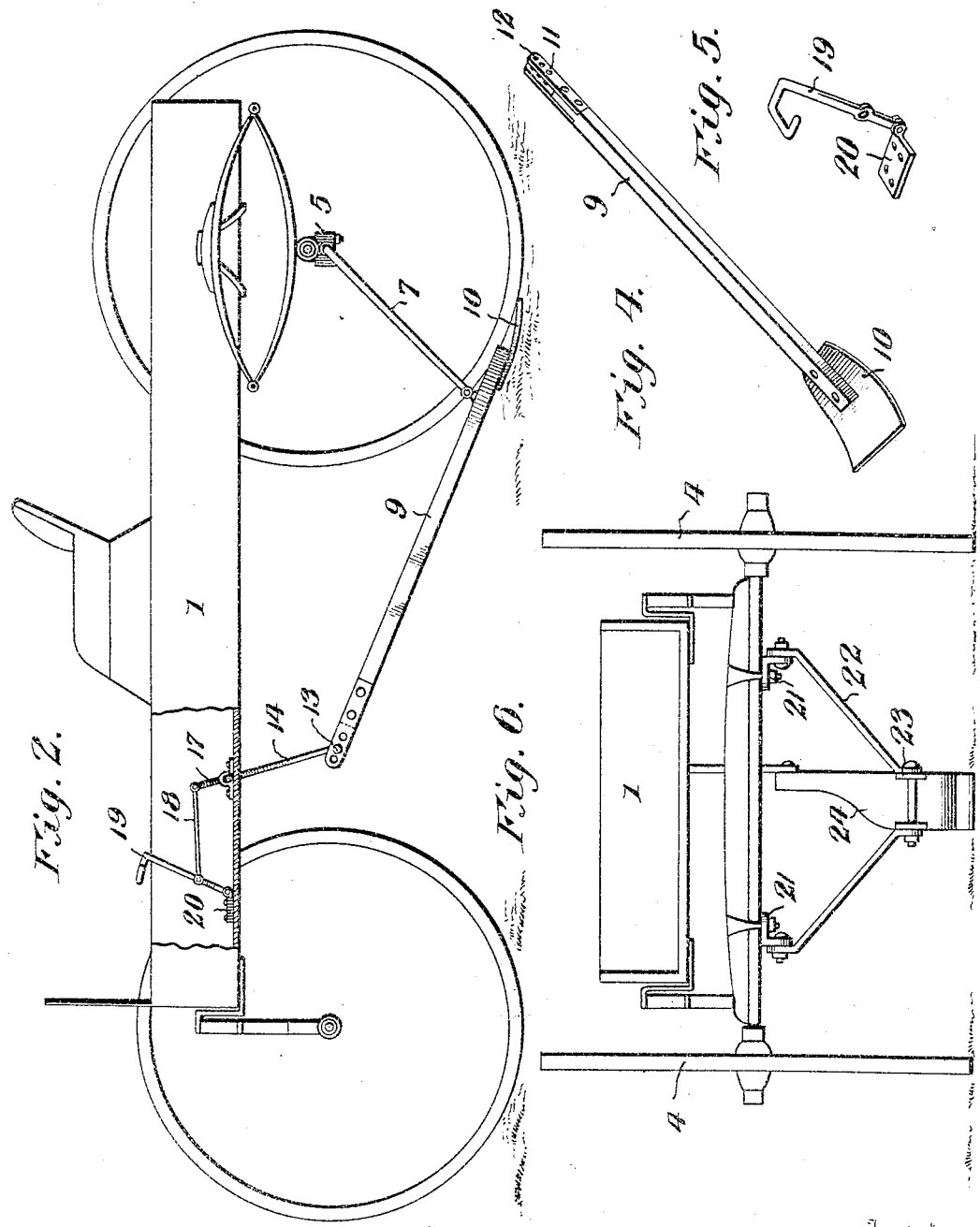

Patented December 27, 1904.

UNITED STATES PATENT OFFICE.

CALVIN A. BUFFINGTON, OF BERKSHIRE, NEW YORK.

VEHICLE-BRAKE.

SPECIFICATION forming part of Letters Patent No. 778,631, dated December 27, 1904.

Application filed June 22, 1904. Serial No. 213,698.

*To all whom it may concern:*

Be it known that I, CALVIN A. BUFFINGTON, a citizen of the United States, residing at Berkshire, in the county of Tioga and State of New York, have invented new and useful Improvements in Vehicle-Brakes, of which the following is a specification.

My invention relates to new and useful improvements in vehicle-brakes; and its object is to provide a simple and inexpensive device of this character which can be readily applied to various forms of carriages and wagons and which is practically unnoticeable except when applied.

A further object is to provide a brake which is adapted to contact with the ground at a point removed from the rear wheels of the vehicle and raise one or both of said wheels from the ground.

With the above and other objects in view the invention consists of brackets adapted to be secured to the rear axle of a vehicle and provided with hangers which are pivoted thereto and are pivotally connected to a beam having a resilient brake-shoe extending therefrom. The other end of the beam is pivoted to a crank extending from a shaft which is fulcrumed upon the wagon-body and is adapted to be rotated by means of a foot-lever provided for that purpose.

The invention also consists in the further novel construction and combination of parts hereinafter more fully described and claimed, and illustrated in the accompanying drawings, showing the preferred form of my invention, and in which—

Figure 1 is a side elevation of a vehicle having my improved brake connected thereto, the brake being shown out of applied position and a portion of the vehicle-body being removed to show the foot-lever and the parts connected thereto. Fig. 2 is a view similar to Fig. 1, but showing the brake applied. Fig. 3 is a rear elevation of the vehicle with the parts in the positions shown in Fig. 2. Fig. 4 is a detail view of the brake beam and shoe. Fig. 5 is a detail view of the foot-lever, and Fig. 6 is a view similar to Fig. 3 and showing a modified form of brake.

Referring to the figures by numerals of reference, 1 is a vehicle-body supported upon axles 2 and 3, on which are arranged wheels 4. Secured to the rear axle 2, at one side of the center thereof, are internally-screw-threaded blocks 5, in which is mounted a screw-threaded rod 6, having an integral arm 7 at one end, said arm being braced by a rod 8, which is secured to one end of the rod 6 and adjacent the free end of arm 7. This arm 7 is pivoted to a beam 9, which is provided at its rear end and adjacent its point of connection with arm 7 with a shoe 10, preferably formed of heavy sheet metal of a resilient nature. Parallel ears 11 extend from the other end of beam 9 and have apertures 12 for the reception of a pin 13. This pin engages one end of a crank 14, which depends from a shaft 15, revolubly mounted in bearings 16, located upon the bottom of the vehicle-body 1. Another crank, 17, is located at the other end of shaft 15 and is connected by a link 18 with a foot-lever 19, pivoted at one end to a plate 20, adapted to be secured to the bottom of the vehicle-body. The link 18 is preferably connected to lever 19 at a point between the ends thereof.

It will be seen that when the lever 19 is pressed downward upon the bottom of the vehicle-body 1 the cranks 17 and 14 are swung so as to draw arm 7 forward. Beam 9 is therefore raised into the position shown in Fig. 1, where it is close to the vehicle-body and practically unnoticeable. When it is desired to apply the brake, foot-lever 19 is pressed forward and causes crank 14 to swing backward. A similar movement is imparted to arm 7; but as said arm is longer and lower than the crank 14 it is obvious that the shoe 10 at the rear end of beam 9 will swing downward into contact with the ground, and the forward movement of the wheels 4, in addition to slight pressure which may be exerted upon the lever 19, will cause the shoe 10 to bear tightly on the ground and raise the rear wheels. As the shoe 10 is made of resilient metal, it will be understood that jarring of the vehicle during the application of the brake is prevented. Moreover, by screw-threading rod 6 said rod can be rotated without becoming displaced, and it is unnecessary to use nuts or other securing devices for locking the rod in position. However, instead of using the screw-threaded rod I may, if desired, employ the construction shown in Fig. 6. By referring to said figure it will be seen that brackets 21 are fastened to the rear axle of the vehicle, and pivoted to these brackets are hangers 22, which are pivoted to ears 23, located at opposite sides of the brake-beam 24.

While I have shown the brake-beam located at the center of the vehicle, it will be understood that, if desired, it may be arranged at one side of the center, so as to raise only one wheel when applied. The brake is very simple and compact in construction and can be readily attached to almost any form of vehicle. When it is not in use it is unnoticeable, and by employing it the wheels of the vehicle are not subjected to the wear and tear which is ordinarily produced by the use of brake-shoes which are adapted to contact with the tires of the wheels.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with a vehicle-body, axles, and wheels for supporting the same; of a brake-beam, a resilient shoe at one end thereof, supporting devices pivoted to the vehicle-body and one of the axles, respectively, and to opposite portions of the beam, an operating-lever within the body, and a link connecting the lever with one of the supporting devices.

2. The combination with a vehicle-body, axles therefor, and wheels for supporting the same; of internally-screw-threaded blocks connected to one of the axles, a screw-threaded rod extending therethrough, an arm upon the rod, a crank-shaft upon the vehicle-body, a brake-beam pivoted to the crank-shaft and arm, a spring-shoe extending from one end of the beam, and means for operating the crank-shaft.

3. The combination with a vehicle-body, axles therefor, and wheels for supporting the axles; of internally-screw-threaded blocks connected to one of the axles, a screw-threaded rod extending therefrom, an arm at one end of the rod, a brake-beam pivoted to said arm and normally in position between the axles, a crank-shaft journaled upon the body and connected to the beam, a lever, and a link connecting the lever and the crank-shaft.

4. The combination with a vehicle-body, axles therefor, and wheels for supporting the same; of internally-screw-threaded blocks secured to one of the axles, a screw-threaded rod extending therefrom, an arm upon the rod, a brace therefor, a brake-beam pivoted to the arm and normally in position between the axles, a shaft upon the vehicle-body, oppositely-extending cranks thereon, one of said cranks being pivoted to the beam, an operating-lever, a link connecting the other crank with said lever, and a spring brake-shoe extending from one end of the beam.

5. A brake for vehicles comprising internally-screw-threaded blocks, a screw-threaded rod extending therefrom, an arm at one end of the rod, a shaft, cranks thereon, a brake-beam pivoted to the arm and one of the cranks, a brake-shoe extending from one end of the beam, an operating-lever, and a link connecting one of the cranks with said lever.

6. The combination with a vehicle-body, axles, and wheels for supporting the same; of threaded blocks connected to one of the axles, a rod adjustably engaging the blocks, an arm extending from the rod, a brake-beam pivoted to the arm, a supporting and operating device connecting the beam and vehicle-body, and a shoe at one end of the brake-beam.

In testimony whereof I affix my signature in presence of two witnesses.

CALVIN A. BUFFINGTON.

Witnesses:
HORATIO CLARK,
D. P. WITTER.